May 19, 1970 J. B. RIDDLE ET AL 3,513,298

HIGH SECURITY CREDIT CARD SYSTEM

Filed Aug. 5, 1964 2 Sheets-Sheet 1

INVENTORS
JOHN B. RIDDLE
ROBERT B. McLAUGHLIN
BY
Raylor + Neal
ATTORNEYS

United States Patent Office 3,513,298
Patented May 19, 1970

---

3,513,298
HIGH SECURITY CREDIT CARD SYSTEM
John B. Riddle, 14228 Amherst Court, Los Altos Hills, Calif. 94022, and Robert B. McLaughlin, 538 Madison Way, Palo Alto, Calif. 94303
Filed Aug. 5, 1964, Ser. No. 387,695
Int. Cl. G06k 7/00
U.S. Cl. 235—61.11     1 Claim

ABSTRACT OF THE DISCLOSURE

Means for reading digital information recorded on parallel magnetic recording tracks including a pair of magnetic heads for reading the tracks simultaneously, an or-circuit connected to the heads for generating a self-clocking timing signal; a shift register for combining the output of one of the heads and the clock signal to register information read by the one head, a multivibrator connected to the clock signal to generate a reject signal responsive to each clock pulse, and an exclusive or-circuit connected to a hold terminal of the multivibrator and to both of the recording heads but preventing generation of the rejection signal when one, but not both, of the recording heads reads a bit of information.

---

This invention relates to a banking system and more particularly to a method and apparatus for partially automating the handling of savings accounts and the like.

When a banking institution is able and willing to invest a sufficient amount of money in data processing equipment, it can obtain a computer system for automating its savings account operations while retaining substantially the same banking system by which it had handled the accounts manually. However, a complete computer system of this type is often unnecessarily complex and more expensive than many banking institutions can afford.

It is an object of this invention to provide a method and apparatus for partially automating savings account systems and the like to provide an economical system having the advantages of speed and accuracy obtainable with computer systems.

It is another object of the invention to provide such a method and apparatus which is adapted to employ basic computer components without requiring the use of a complete computer memory for all accounts in the system maintained on line for instantaneous reference.

It is another object of the invention to provide such a method and apparatus with which a banking institution can partially automate its savings account operations in an efficient manner during a prolonged intermediate period while it converts its operations to a fully computer controlled system.

It is a particular object of the invention to provide a method and apparatus for controlling savings accounts and the like with credit cards for each savings account customer with each credit card carrying high security alterable indicia denoting valuable information concerning the account and where the authenticity of the indicia may be verified by a banking institution or the like without reference to a complete memory of all of the accounts maintained by the institution.

Other objects and advantages of the invention will become apparent from the following description read in conjunction with the attached drawings in which.

Figure 1:
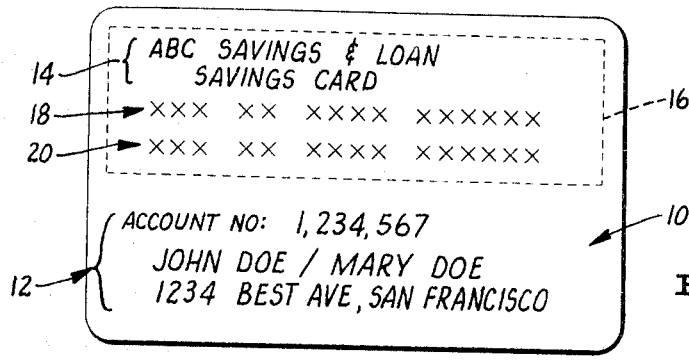
FIG. 1 is a plan view of a credit card employed in connection with this invention.

In accordance with this invention, a banking institution which maintains a plurality of savings accounts or the like issues to the customer for each of the accounts a credit card which must be presented in lieu of a savings account passbook when withdrawals from the account are to be made. One form of this credit card is illustrated in FIG. 1. The card shown therein consists of a body of plastic material 10 in which may be embossed indicia 12 denoting the savings account customer and savings account number. The indicia 12 may be employed in customary manner for identifying the credit card and printing credit card identifying indicia on business forms which record individual transactions effecting the account. The credit card also carries indicia 14 printed on the card denoting the banking institution at which the card may be honored. Embedded in the card outside the area of the embossed indicia 12 is a body of magnetizable material 16 on which an alterable magnetic record may be provided. The magnetic material 16 may be applied to an exterior face of the card but is preferably embedded in the card below a surface laminate thereof to protect the magnetic material from mechanical and magnetic alteration. Preferably, the body of magnetic material 16 is formed of a high magnetic strength, high coercivity material such as a layered alloy of cobalt and nickel where each layer has a thickness approximately equal to the thickness of one magnetic domain. As indicated hereinafter, a magnetic record is provided on the magnetizable material 16 in the form of two parallel tracks of magnetic patterns 18 and 20 which may be simultaneously recorded on the magnetic material or simultaneously read from the magnetic material by a conventional two track magnetic head.

In accordance with this invention, the credit card shown in FIG. 1 may be employed by a banking institution in place of a savings account passbook as an identification card which must be presented before a withdrawal from an account may be made. The banking institution may verify the authenticity of the card in a number of ways without reference to a complete memory of all accounts maintained by the institution, and preferably the card is verified by either or both of the methods described below. In accordance with the first method, the magnetic indicia on the card is employed as a record of the account balance in the savings account, and the card is used to enter the account balance in accounting apparatus automatically while the manner in which the magnetic indicia is recorded on the card is tested to verify the authenticity of the card and the fact that the magnetic indicia has not been altered. In accordance with the second method, the magnetic indicia constitutes a cryptographic identifier which is matched through a cryptographic transformation common to all cards with an identification character known only to the owner of the card so that the card cannot be used for a withdrawal by an unauthorized person.

Figure 3:
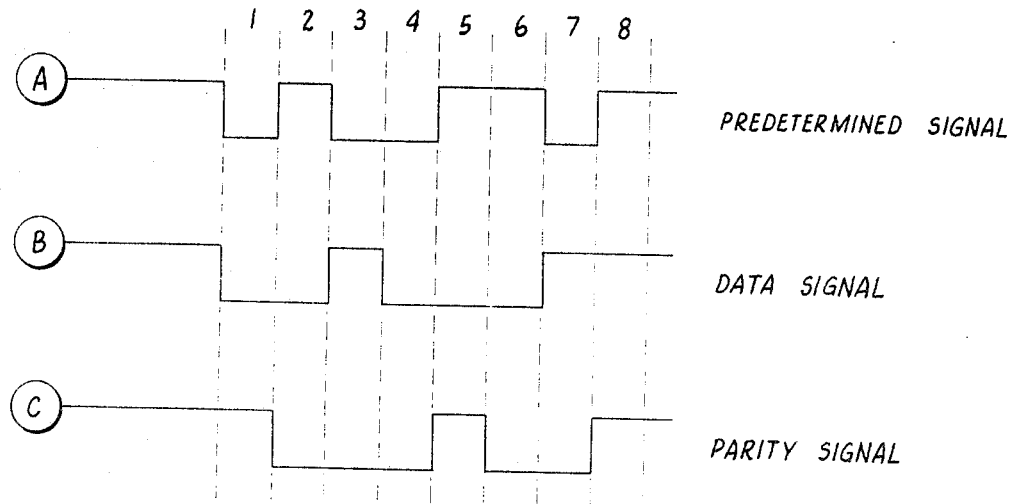
FIG. 3 is a diagram illustrating the relation between three electrical signals used in the method and apparatus of this invention.

By way of further explanation of the first method mentioned above, reference is made to FIG. 3 which illustrates schematically electrical signals which are employed in recording information on the card and verifying its authenticity. In FIG. 3, three electrical signals A, B and C are illustrated in spacial synchronization with each other where each value on each of the signals B and C corresponds to the value of the signal A with which it is vertically aligned. Signal A is a predetermined electrical signal which represents a binary number which is, for instance, the binary equivalent of the current account balance in a particular savings account. Signal A carries "two phase" information in the sense that at any instant it denotes a one (1) or a zero (0) in the binary system depending upon whether the signal is in its positive or negative condition. For purposes of illustration, the signal A may be said to be in the 1 phase during the time intervals labeled 1, 3, 4 and 7, and it is in the 0 phase during the time intervals labeled 2, 5, 6 and 8. Signals B and C in FIG. 3 are parameters of signal A in that each of the signals B and C carries one phase of the information of signal A and in synchronization with signal A. Thus, signal B is related to signal A in that signal B undergoes a transformation from positive to negative or from negative to positive each time that signal A enters a 1 phase time interval, 1, 3, 4 or 7. Signal C carries the other phase of the information in signal A and in synchronization with signal A in that signal C undergoes a transformation from positive to negative or negative to positive each time that signal A enters a 0 phase time interval, 2, 5, 6 and 8. In accordance with the first method mentioned above, the account balance of each savings account is recorded in tracks 18 and 20 of the credit card corresponding to that account by recording in the tracks 18 and 20 magnetic patterns which are generated by applying to magnetic transducers the signals B and C respectively which correspond to a predetermined signal A which denotes that account balance. The recording of the account balance on the credit card by recording the signals B and C instead of signal A has several very pronounced advantages. As explained hereinafter, this method provides two magnetic records on the credit card which may be compared to each other when they are read to help assure the banking institution that the signals have not been altered since they were originally recorded on the card. Thus, the two signals B and C may be employed as a data signal and a parity signal respectively where any unauthorized alteration in the data signal would have to be accomplished by an unobvious alteration of the parity signal if any unauthorized alteration of the magnetic record on the card were to escape detection by the banking institution. Secondly, the recording on the credit card of the predetermined signal A in the form of the two component signals B and C permits the recorded information on the card to be read from the card magnetically as a self-clocking synchronous signal which may be employed as an input to synchronous computer components such as a synchronous shift register without requiring that a clocking track be recorded on the credit card and read by a third magnetic transducer. Additionally, the recording of the predetermined signal A as the component signals B and C permits the record to be read from the credit card as a self-clocking signal independent of the reading speed at which a magnetic transducer moves over the card.

Figure 4:
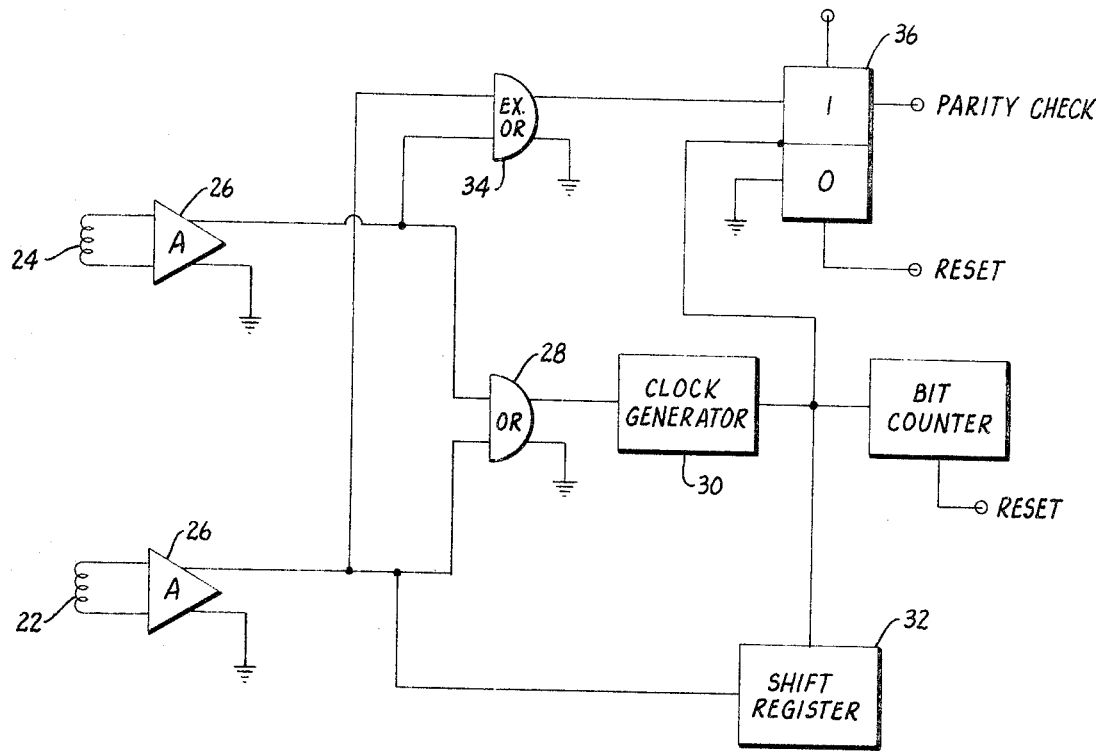
FIG. 4 is a schematic wiring diagram of apparatus employed in this invention for reading magnetic credit cards and verifying the authenticity of magnetic records carried thereby.

FIG. 4 illustrates schematically circuit components which may be employed to read the signals B and C from the tracks 18 and 20 of the credit card while verifying the parity of the signals B and C and entering the predetermined signal A derived from signals B and C into a synchronous shift register. With reference to FIG. 4, a pair of magnetic transducers 22 and 24 are provided for reading the tracks 18 and 20 respectively with the transducers 22 and 24 preferably constituting the components of a conventional two track recording and reading head. The signals generated by the transducers 22 and 24 are amplified by amplifiers 26 and may be subjected to suitable shaping by conventional means to adjust their generally sinusoidal shapes to the square wave shapes of signals B and C. The outputs of the amplifiers 26 are fed to an or-gate 28 which generates a pulse each time that the signal from either of the amplifiers 26 undergoes a transformation, and the output of the or-gate 28 is connected to a clock generator 30 to generate a clocking pulse each time that a pulse passes the or-gate 28. It will be noted that when the transducers 22 and 24 generate the data and parity signals B and C respectively, the clock generator 30 generates a clocking pulse for each time interval of the predetermined signal A. As indicated in FIG. 4, the clocking signal and data signal are connected to a shift register 32; the shift register 32 is a conventional synchronous computer component and contains suitable logic for entering in the shift register the decimal number corresponding to signal A when the data signal B is fed into the shift register in synchronization with the clocking signal. In this way, the apparatus of FIG. 4 enters in the synchronous shift register the two phase data carried by signals B and C.

The outputs of the amplifiers 26 are also connected to an exclusive or-gate 34 the output of which is connected to a multivibrator 36 driven by the clocking signal while the clocking signal is connected to a bit counter to count the number of clocking pulses generated by the clock generator. The bit counter authenticates the overall length of the two signals B and C by counting the total number of clock pulses and energizing a reset or reject line if the bit counter counts a greater or lesser number of signal time intervals than should be present in the predetermined signal A. The multivibrator 36 determines that the signals B and C are in parity with each other; and the exclusive or-gate will pass an output pulse when and only when signals B and C jointly undergo one and only one transition at any given time. If the two signals B and C both undergo transitions at the same time, which is a test of their parity, the exclusive or-gate 34 will not generate an output pulse at a time when the or-gate 28 generates a clocking pulse through the clock generator 30, and the clocking pulse, unaccompanied by an output pulse from the exclusive or-gate will invert the multivibrator 36 to energize a reset or reject terminal.

The second method of verifying the magnetic indicia on the credit card may also be performed with the apparatus of FIG. 4 inter alia where the magnetic signal used in the second method is recorded on the tracks 18 and 20, and where the transducers 22 and 24 are employed for reading those tracks. In the use of this second method, the banking institution employs any one of a wide variety of cryptographic transformation devices by which any predetermined identification character may be scrambled into an unintelligible cryptographic identification signal. When a new savings account and credit card is first assigned to a savings account customer, the customer is permitted to select any identification character which he wishes, for instance, his birthday, a portion of his social security number, his telephone number, or any other numerical or alphabetical identifier, and this identifier is known only to himself. He is then permitted to enter his identifier into the cryptographic transformer, and the cryptographic transformer converts his identifier into an unintelligible scrambled electrical signal which is recorded on one or both of the tracks 18 and 20 on the credit card. When at a later date the customer wishes to make a withdrawal from his savings account, he presents his credit card to the banking institution and is requested by a teller to identify himself by entering his identification character in a suitable keyboard or the like which may be positioned on the customer's side of a banking counter out of sight of the teller and of the customers. The cryptographic identifier recorded on the credit card may then be read magnetically from the card and compared with the identification character supplied by the customer using the cryptographic transformer to verify to the teller that the holder of the card is either person to whom the card was originally issued or his authorized representative to whom he has told his unique identification character. In order that the banking institution may prevent disclosure of the transformation made by the cryptographic transformer and other tampering with the system, the cryptographic transformer may be changed periodically to alter the cryptographic transformation which it performs, and when this procedure is employed, the cryptographic transformer is preferably made to provide in the cryptographic identifier indicia indicating the particular cryptographic transformation by which the cryptographic identifier read from the credit card was originally prepared from the identification character.

Figure 2:
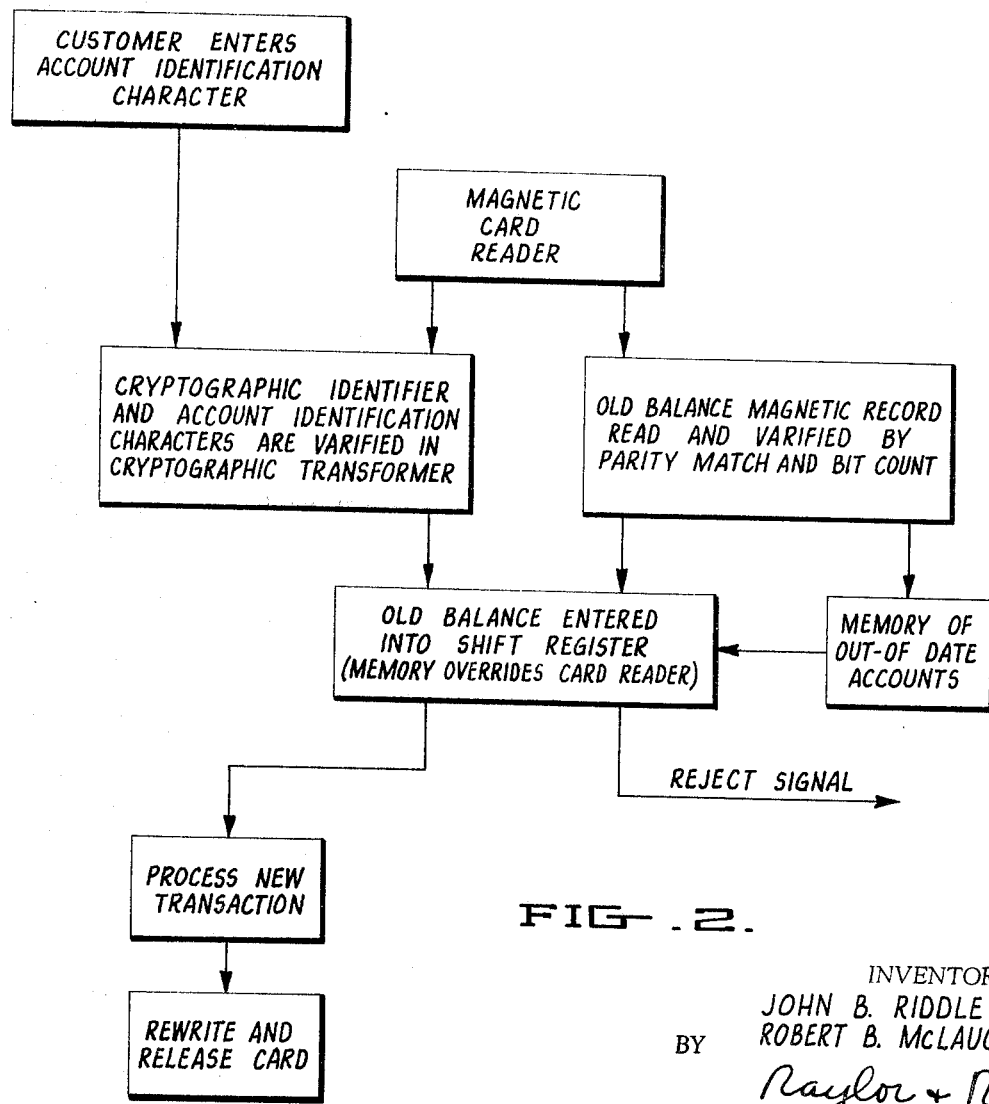
FIG. 2 is a schematic diagram illustrating the method and apparatus employed in this invention.

While certain structural components and features of the apparatus and method of this invention have been described in detail, it is obvious that a wide variety of components and method steps may be employed within the spirit of the appended claims. A general system in which the apparatus and method steps described above may be employed is illustrated schematically in FIG. 2 where the legends in sequential boxes indicate in general terms the apparatus and method steps which may be performed sequentially in accordance with this invention. As indicated in FIG. 2, the credit card and credit card verification means are preferably employed with suitable computer components into which information recorded on the credit card may be entered and used with all the speed and accuracy obtainable by computer components while attributing to the information recorded on the credit card truth and veracity which normally may not be safely attributed to credit cards. Where the magnetic indicia on the credit card denotes the account balance of the savings account to which the card relates, the apparatus employed with the card preferably includes a small computer memory listing the current account balances of savings accounts which are known to have outstanding credit cards bearing magnetic indicia of out of date account balances. The method and apparatus of the invention may initially be employed without this memory where tellers are instructed to honor any credit card up to the amount of the account balance indicated thereon and where no withdrawals from the account may be made without presenting the credit card. After a banking institution employs the method and apparatus in this way for some time and becomes financially able to expand its computer system, the memory of out of date accounts may be added to permit each teller to handle complete transactions for all savings accounts while a single relatively small computer memory at each branch bank may maintain all account information for all branches of the banking institution necessary for each teller to handle all potential transactions for the institution. At a still later date, the out of date accounts memory may be converted, employing the same apparatus, to a complete memory of current account balances for the branch bank in which the memory is located obviating any further necessity of recording account balances on the credit cards and thereafter verifying the credit card solely for the purpose of personal identification of the bearer. The expansion of computer memory facilities in this way permits a banking institution to enter the computer control field while spreading its investment in data processing equipment over a substantial period of time so that the institution can ultimately build a data processing facility capable of handling more operating transactions as they occur without going through any intermediate development stage in which large data processing equipment must be used inefficiently by maintaining large memories complete with all account information in an on-line condition for immediate memory access for operating transactions.

While certain features and advantages of the invention have been illustrated and described in detail herein, it is obvious that many modifications thereof may be made without departing from the spirit and scope of the invention.

We claim:

1. Means for reproducing digital information, a pair of magnetically recorded tracks where the information recorded in each of said tracks is a complement of the information recorded in the other track which comprises: a pair of magnetic reading heads for simultaneously reading said tracks, an or-circuit connected to said heads for generating a clock signal having a clock pulse for every time interval when either of said heads reads a bit of information from one of said tracks, a shift register connected to one of said heads and to the output of said or-circuit for registering digital information read by said one reading head in synchronization with said clock signal, a multivibrator connected to the output of said or-circuit for generating a reject signal when a clock pulse is generated by said or-circuit with said multivibrator having a hold terminal for preventing generation of said reject signal when a pulse is delivered to said hold terminal simultaneously with a clock pulse from said or-circuit, and an exclusive or-circuit connected to both of said reading heads for generating an output pulse when one, but not both, of said heads reads a bit of information with the output of said exclusive or-circuit connected to said hold terminal of said multivibrator.

References Cited

UNITED STATES PATENTS

| 2,952,008 | 9/1960 | Mitchell et al. | 235—61.114 |
| 3,281,804 | 10/1966 | Dirks | 340—174.16 |

THOMAS A. ROBINSON, Primary Examiner

U.S. Cl. X.R.

340—149